US012000087B2

(12) United States Patent
Lalonde et al.

(10) Patent No.: US 12,000,087 B2
(45) Date of Patent: **\*Jun. 4, 2024**

(54) COMBUSTION OF STREAMS DERIVED FROM HOT WATER EXTRACTION OF WOOD MATERIAL

(71) Applicant: CASCADES CANADA ULC, Témiscouata-sur-le-Lac (CA)

(72) Inventors: Jonathan Lalonde, Témiscouata-sur-le-Lac (CA); Pierre Hudon, Shawinigan (CA); Claude Audet, Kingsey-Falls (CA); Pierre Boulay, Kingsey-Falls (CA); Smail Kalla, Saint-Jérôme (CA); Gérard Gosselin, Québec (CA); Robert Martineau, Québec (CA)

(73) Assignee: Cascades Canada ULC (CA)

( * ) Notice: Subject to any disclaimer, the term of this patent is extended or adjusted under 35 U.S.C. 154(b) by 62 days.

This patent is subject to a terminal disclaimer.

(21) Appl. No.: 17/563,769

(22) Filed: Dec. 28, 2021

(65) Prior Publication Data
US 2022/0120036 A1  Apr. 21, 2022

Related U.S. Application Data

(63) Continuation of application No. 16/374,463, filed on Apr. 3, 2019, now Pat. No. 11,512,428.

(30) Foreign Application Priority Data

Apr. 4, 2018 (CA) .................................. CA 3000248

(51) Int. Cl.
*D21C 11/12* (2006.01)
*D21C 1/02* (2006.01)
(Continued)

(52) U.S. Cl.
CPC .............. *D21C 11/12* (2013.01); *D21C 1/02* (2013.01); *D21C 11/0007* (2013.01);
(Continued)

(58) Field of Classification Search
CPC ..................................................... D21C 11/12
See application file for complete search history.

(56) References Cited

U.S. PATENT DOCUMENTS 4,096,028 A  6/1978  Rosenberger
6,071,377 A  6/2000  Lindman
(Continued)

FOREIGN PATENT DOCUMENTS

CN  102424437  6/2013

OTHER PUBLICATIONS

Loebker et al., Black Liquor Sprays to the Kraft Recovery Boiler Using Effervescent Atomization, 1999, Institute of Paper Science and Technology (Year: 1999).
(Continued)

*Primary Examiner* — Anthony Calandra
(74) *Attorney, Agent, or Firm* — McAndrews, Held & Malloy, Ltd.

(57) ABSTRACT

Various techniques are described for enhanced combustion of hot water extraction (HWE) derived liquor. For example, the HWE derived liquor can be pre-treated prior to introduction into a combustion chamber. The pre-treatment can include subjecting HWE derived liquor to filtration to remove suspended solids, evaporation to produce a first stage concentrated HWE liquor; additional concentration to produce a second stage concentrated HWE liquor; additional filtration to remove additional suspended solids; and preheating to produce a preheated HWE liquor. The preheated HWE liquor can be atomized and combined with pre-heated combustion air supplied into a combustion chamber to effect combustion of the HWE derived liquor.

18 Claims, 4 Drawing Sheets

(51) Int. Cl.
    *D21C 11/00*      (2006.01)
    *D21C 11/10*      (2006.01)
    *F23G 7/04*      (2006.01)
    *B01D 1/00*      (2006.01)
    *B01D 37/00*      (2006.01)
    *D21J 1/00*      (2006.01)

(52) U.S. Cl.
    CPC ............ *D21C 11/10* (2013.01); *D21C 11/122* (2013.01); *F23G 7/04* (2013.01); *B01D 1/0011* (2013.01); *B01D 37/00* (2013.01); *D21J 1/00* (2013.01)

(56) References Cited

U.S. PATENT DOCUMENTS

| | | |
|---|---|---|
| 2014/0288298 A1 | 9/2014 | Nakagame et al. |
| 2017/0226695 A1* | 8/2017 | Rowlands ................ C10G 1/10 |
| 2020/0040273 A1 | 2/2020 | Gronn |

OTHER PUBLICATIONS

Smook, Handbook for Pulp and Paper Technologists, 1992, Angus Wilde Publications, 2nd edition, chapter 10. (Year: 1992).

* cited by examiner

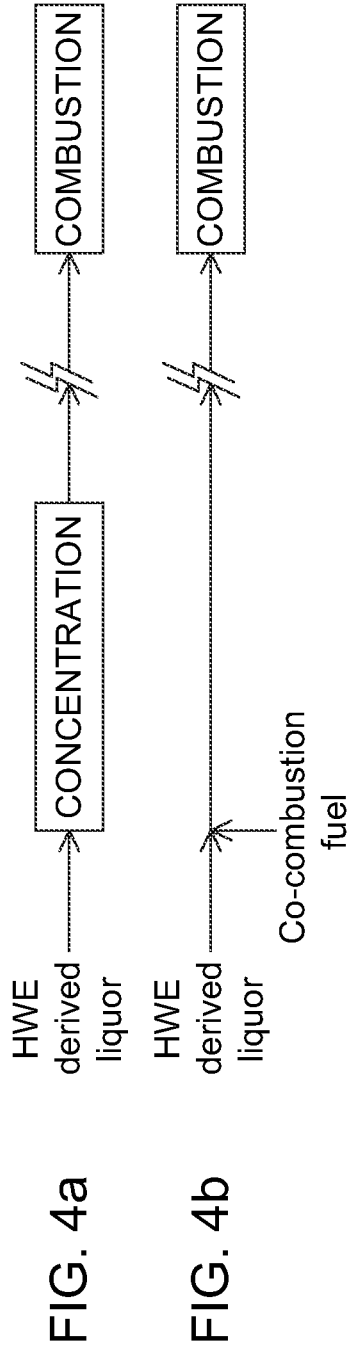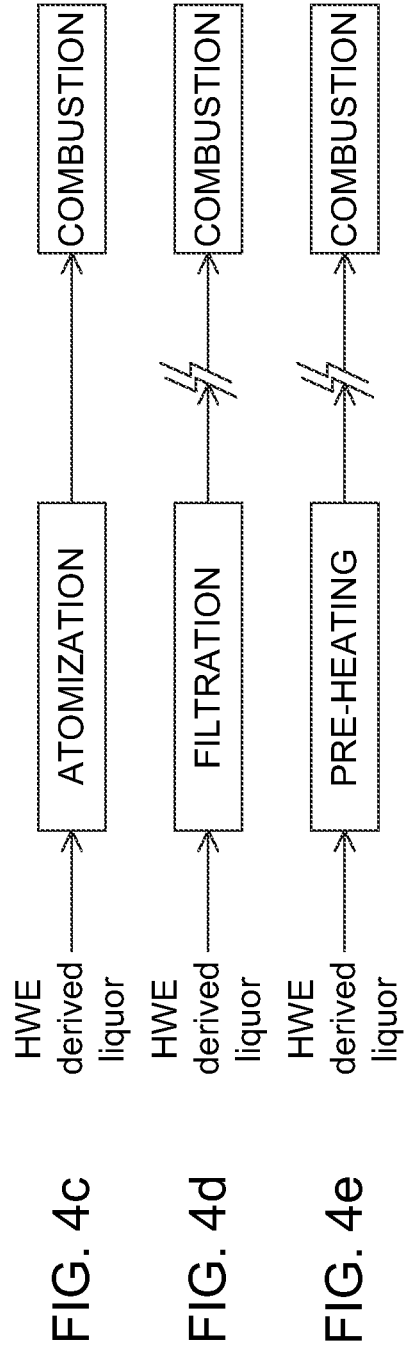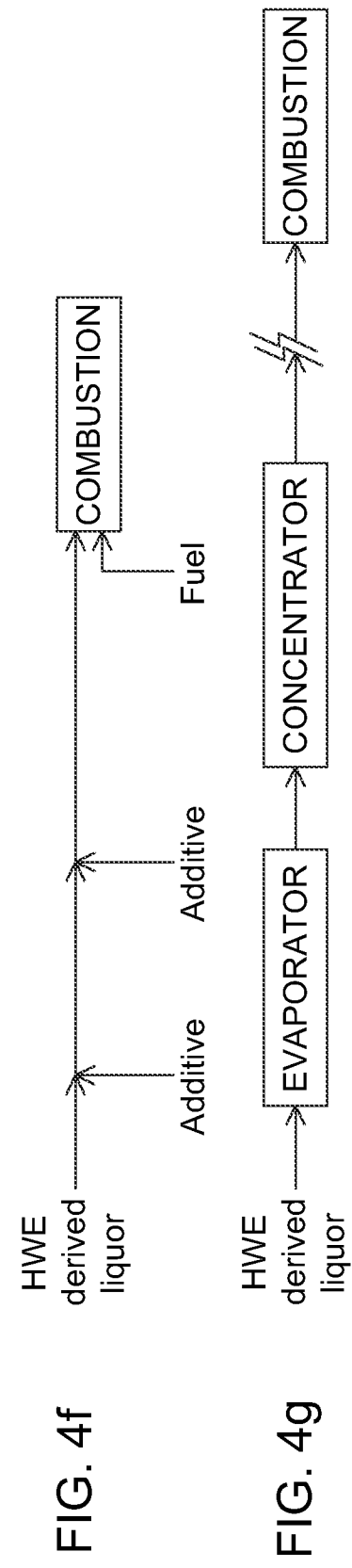

COMBUSTION OF STREAMS DERIVED FROM HOT WATER EXTRACTION OF WOOD MATERIAL

RELATED APPLICATIONS

This application is a continuation of and claims priority to U.S. patent application Ser. No. 16/374,463, filed Apr. 3, 2019, and which claims priority to Canadian patent application 3,000,248, filed Apr. 4, 2018. The above applications are hereby incorporated by reference in their entireties.

TECHNICAL FIELD

The technical field generally relates to the combustion of hot water extraction (HWE) derived liquor, and more particularly to pulp and paper processes that include a hot water extraction step which produces a cooked mixture separated into a fiber-enriched material and a fiber-depleted HWE derived liquor that can be pre-treated and subjected to combustion.

BACKGROUND

Hot water extraction (HWE) of wood material can produce a cooked mixture that includes fibres, water, hemicellulose and various other components. The fibres can be separated from an aqueous HWE derived liquor, and the fibres can then be subjected to pulping processes to produce paper-based products. The HWE derived liquor can be treated and processed using various methods to produce any number of different bio-products and intermediates. However, variable demand for such bio-products and inventory issues may lead to an accumulation of the HWE derived liquor and its components.

SUMMARY

Techniques are provided for enhanced combustion of hot water extraction (HWE) derived liquor. For example, the HWE derived liquor can be pre-treated prior to introduction into a combustion chamber.

The pre-treatment can include subjecting HWE derived liquor to filtration to remove suspended solids and produce a solids-depleted HWE derived liquor; supplying the solids-depleted HWE derived liquor to an evaporator system to produce a first stage concentrated HWE derived liquor; supplying the first stage concentrated HWE derived liquor to a concentrator (or evaporator) to produce a second stage concentrated HWE derived liquor; subjecting the second stage concentrated HWE derived liquor to additional filtration to remove additional suspended solids and produce a filtered concentrated HWE derived liquor; pre-heating the filtered concentrated HWE derived liquor to produce a preheated HWE derived liquor; and subjecting the preheated HWE derived liquor to atomization to produce an atomized HWE derived liquor. The atomized HWE derived liquor and pre-heated combustion air can then be supplied into the combustion chamber to effect combustion of the HWE derived liquor.

Other pre-treatments are also possible. For example, the HWE derived liquor, which can have a dissolved solids concentration of about 2 wt % to about 10 wt %, can be concentrated to produce a concentrated HWE liquor having a dissolved solids concentration of at least 45 wt % prior to combustion. The HWE derived liquor can be subjected to various filtering steps for removing suspended solids from the HWE derived liquor, and concentration steps for concentrating the HWE derived liquor to increase dissolved solids concentration therein. The HWE derived liquor can also be subjected to pre-heating and atomization for enhanced combustion. Co-combustibles can also be added into the HWE derived liquor and/or independently into the combustion chamber.

In some implementations, there is provided a process for combusting hot water extraction (HWE) derived liquor, comprising: subjecting HWE derived liquor to filtration to remove suspended solids and produce a solids-depleted HWE derived liquor; supplying the solids-depleted HWE derived liquor to an evaporator system to produce a first stage concentrated HWE derived liquor; supplying the first stage concentrated HWE derived liquor to a concentrator (or evaporator) to produce a second stage concentrated HWE derived liquor; subjecting the second stage concentrated HWE derived liquor to additional filtration to remove additional suspended solids and produce a filtered concentrated HWE derived liquor; pre-heating the filtered concentrated HWE derived liquor to produce a preheated HWE derived liquor; subjecting the preheated HWE derived liquor to atomization to produce an atomized HWE derived liquor; pre-heating air to produce heated combustion air; and supplying the atomized HWE derived liquor and the heated combustion air into a combustion chamber to effect combustion of the HWE derived liquor.

In some implementations, the filtration and/or the additional filtration is performed using a strainer type separator, a basket separator, a belt filter and/or a drum filter. In some implementations, the atomization is performed by injecting pressurized air, steam and/or a light hydrocarbon into the pre-heated HWE derived liquor. In some implementations, the pre-heating is performed in at least one indirect heat exchanger that receives a heating fluid, and the heating fluid can be steam or hot flue gas. In some implementations, the pre-heating is performed in an electric pre-heater.

In some implementations, the process further includes adding a co-combustion fuel into the combustion chamber, where the co-combustion fuel can be added to the HWE derived liquor prior to introduction into the combustion chamber or the co-combustion fuel is added into the combustion chamber simultaneously and into a same inlet as the HWE derived liquor. The co-combustion fuel can include propane or natural gas. The co-combustion fuel can also be added to the combustion chamber at an independent entry point compared to that of the HWE derived liquor, and the co-combustion fuel can include solid-containing biomass, such as wood residues. In some implementations, at least part of the solid-containing biomass is derived from solid material obtained from the HWE derived liquor during the filtration or the additional filtration.

In some implementations, the HWE derived liquor has an initial concentration of dissolved solids between 2 wt % and 10 wt %, the evaporator system is operated so that the first stage concentrated HWE derived liquor has a concentration of dissolved solids between 25 wt % and 35 wt %, a concentrator system is used and is operated so that the second stage concentrated HWE derived liquor has a concentration of dissolved solids of at least about 45 wt %, and/or the second stage concentrated HWE derived liquor has a concentration of dissolved solids of at least about 55 wt %. The second stage concentrated HWE derived liquor can have a concentration of dissolved solids of at least about 60 wt % or a concentration of dissolved solids of between about 45 wt % and about 70 wt %.

In some implementations, the preheating is performed so that the preheated HWE derived liquor has a temperature above about 55° C. In some implementations, the preheating is performed so that the preheated HWE derived liquor has a temperature up to but below a boiling point of the HWE derived liquor at operating pressures upstream of combustion.

In some implementations, there is provided a process for combusting hot water extraction (HWE) derived liquor, comprising:
  producing HWE derived liquor by:
    subjecting wood material to HWE to produce a mixture comprising fibres, water, dissolved solids and suspended solids;
    separating the mixture into a fibre-enriched stream a fibre-depleted stream;
    filtering the fibre-depleted stream to produce the HWE derived liquor having a dissolved solids concentration of about 2 wt % to about 10 wt %;
  concentrating the HWE derived liquor to produce a concentrated HWE liquor having a dissolved solids concentration of at least 45 wt %;
  supplying the HWE derived liquor and air into a combustion chamber to effect combustion of the HWE derived liquor.

In some implementations, the concentrating is performed in an evaporator system followed by a concentrator system. Alternatively, the concentrating can be performed by one or more evaporators without the use of a concentrator (above 45 wt % or above 55 wt % or up to 60 wt % or above). In some implementations, the process includes filtering the concentrated HWE liquor to remove additional suspended solids therefrom. In some implementations, the process includes pre-heating the concentrated HWE derived liquor to produce a preheated HWE derived liquor prior to combustion. In some implementations, the process includes subjecting the pre-heated HWE derived liquor to atomization to produce an atomized HWE derived liquor that combusted.

In some implementations, there is provided a process for combusting hot water extraction (HWE) derived liquor, comprising: filtering suspended solids from the HWE derived liquor; concentration the HWE derived liquor to increase dissolved solids concentration therein; pre-heating the HWE derived liquor to a temperature above about 55° C.; and atomizing the HWE derived liquor during introduction into a combustion chamber.

In some implementations, there is provided a process for producing paperboard, comprising: subjecting biomass to a hot water extraction (HWE) operation to produce a slurry that comprises pulp and an HWE liquor; separating the pulp from the HWE liquor; subjecting the pulp to pulp processing produce a paperboard product; subjecting the HWE liquor to a pre-treatment prior to combustion to produce energy, the pre-treatment comprising solids removal, concentration, and pre-heating; and utilizing at least some of the energy in the pulp processing, the HWE operation or a combination thereof.

DESCRIPTION OF DRAWINGS

FIGS. 4a to 4g are process flow diagrams showing potential pre-treatments of HWE derived liquor prior to combustion.

DETAILED DESCRIPTION

Various techniques are described herein for handling, treating and subjecting hot water extraction (HWE) derived liquor to combustion. The HWE derived liquor can originate or be derived from HWE of wood material, and can be subjected to various pre-treatments to enhance the combustion of the HWE derived liquor and its components as biofuel, e.g., for steam generation. The pre-treatments can include increasing dissolved solids concentration above a target threshold, e.g., via an evaporator followed by a concentrator; subjecting the HWE derived liquor to filtration to remove suspended solids; pre-heating the HWE derived liquor; subjecting the HWE derived liquor to atomization at an inlet of a combustion chamber; and/or adding a co-combustion fuel into the HWE derived liquor upstream of the combustion chamber, at an inlet of a combustion chamber, and/or adding a co-combustion fuel at an independent inlet of the combustion chamber.

Figure 1:
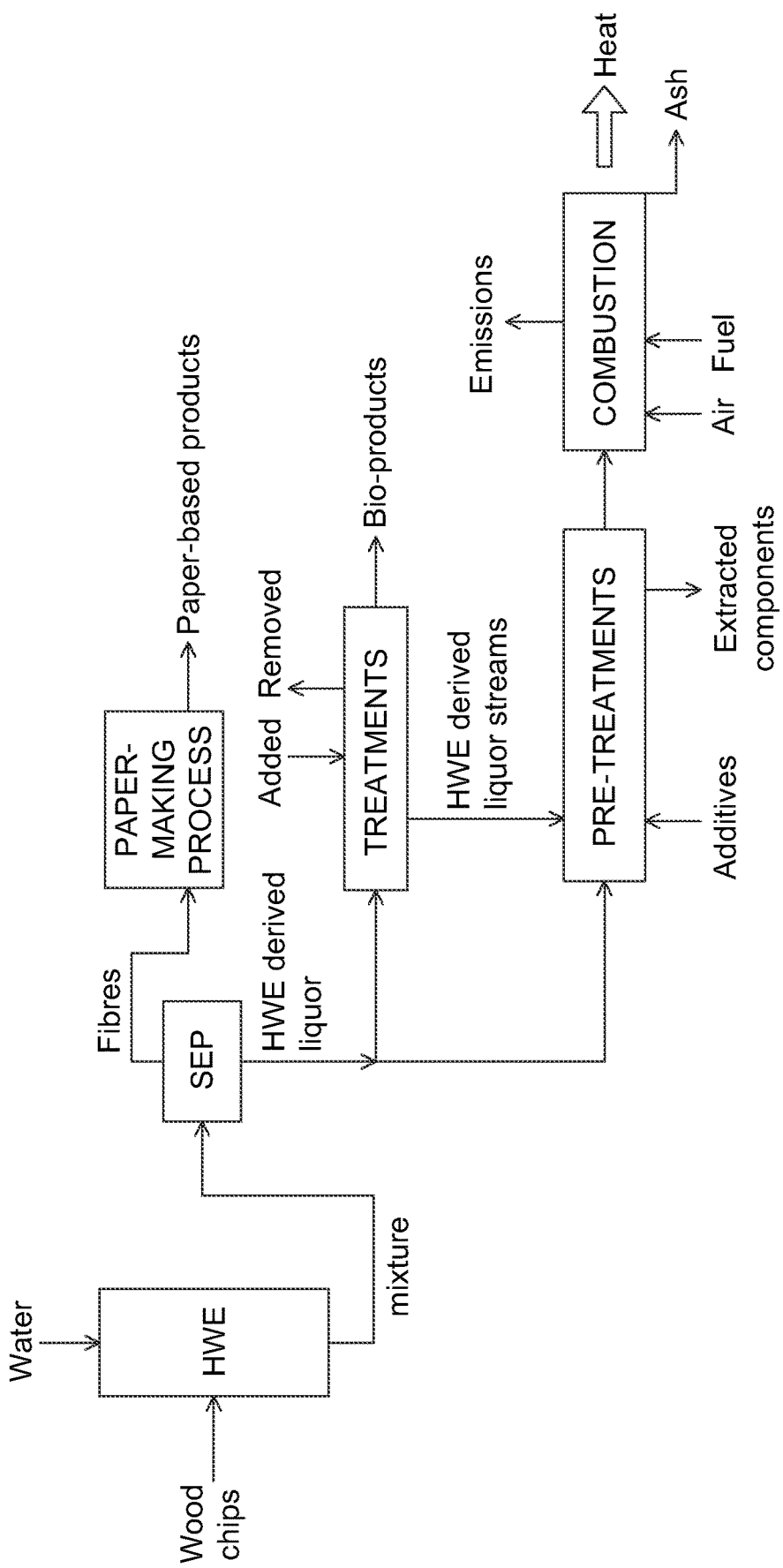
FIG. 1 is a process flow diagram showing a HWE unit and downstream units.

Referring to FIG. 1, wood material (e.g., wood chips, which may include softwood and/or hardwood) can be fed into a HWE unit along with water in the form of hot water or steam.

The HWE unit can be operated at various parameters (e.g., temperature, pressure, etc.) depending on factors such as the desired content of the cooked mixture withdrawn from the HWE unit, the processing time, the wood material being treated, and the downstream processing of the components of the mixture. The cooked mixture is separated to produce a fibre-enriched stream that is subjected to paper-making process steps to produce paper-based products (e.g., paperboard, medium paper for container board, various corrugated products), and HWE derived liquor.

"HWE derived liquor" means the predominantly liquid-based component which is derived from a hot water or steam based process, using no or limited chemical additions, to cook wood material which produces a cooked mixture that mainly separates into at least two sub-products: (i) a fiber-enriched material and (ii) the HWE derived liquor. The HWE derived liquor is a mixture depleted in fibers and other solid components, and includes water as well as various soluble and suspended compounds, such as hemicellulose, sugars, lignin residues, acetic acid, residual small fibers, and other organic and inorganic compounds. The HWE derived liquor can be subjected to combustion after pre-treatment, which serves to modify the compositional and/or physico-chemical characteristics of the liquor compared to the HWE derived liquor initially separated from the cooked mixture obtained from the initial HWE process, thereby enhancing its combustion properties.

Still referring to FIG. 1, the HWE derived liquor can be subjected to treatments in order to produce one or more bio-products. These treatments can include various unit operations, such as separation steps that isolate components of the HWE derived liquor and/or chemical or biochemical modification steps that generate new chemical species. For example, certain sugar components of the stream can be separated and then subjected to fermentation to produce alcohol based bio-products.

Figure 2:
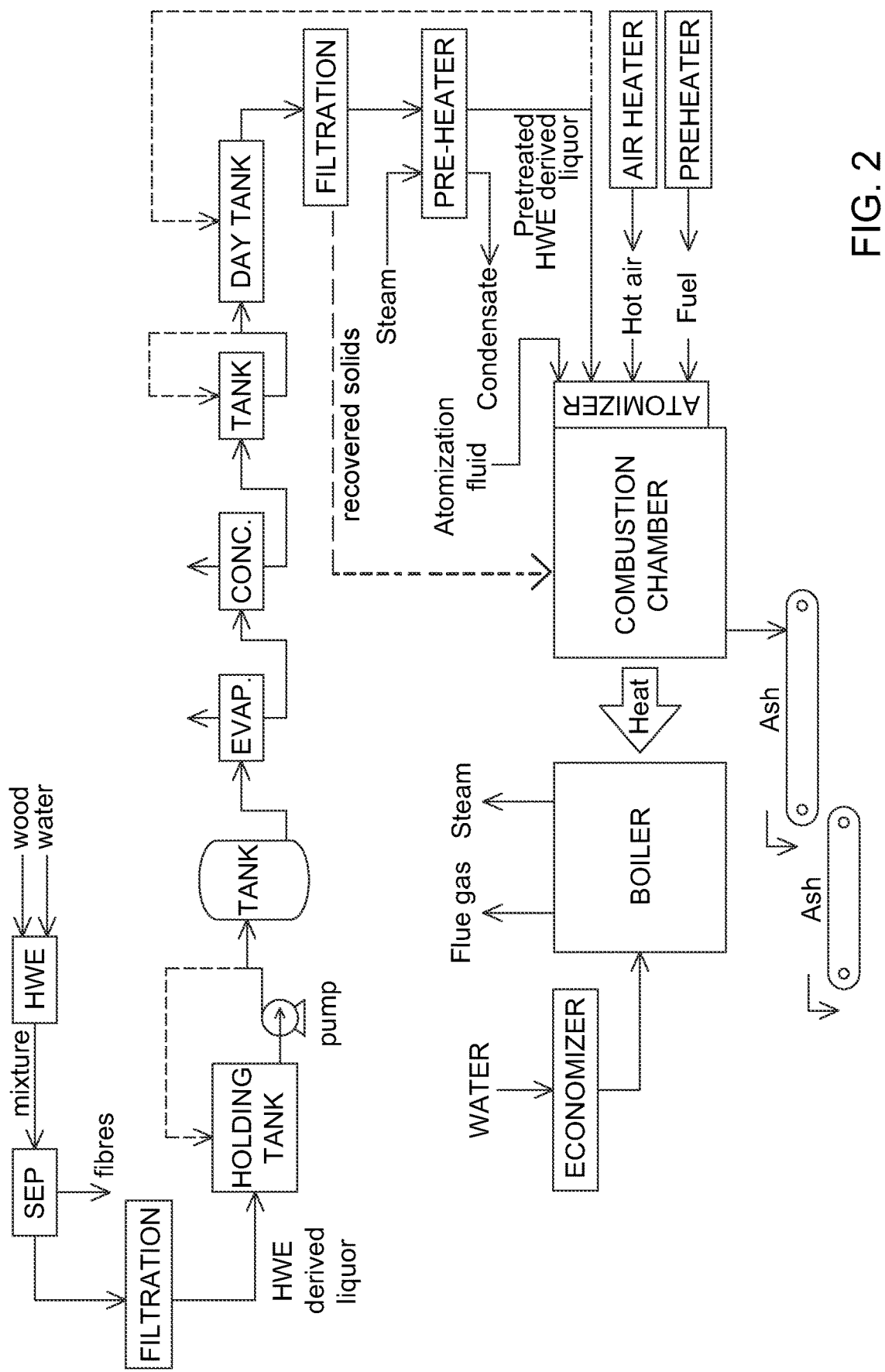
FIG. 2 is a process flow diagram showing treatment of HWE derived liquor followed by combustion and stream generation using the HWE derived liquor as a fuel source.

FIG. 1 also illustrates that the original HWE derived liquor or other HWE derived liquor streams produced during the various treatments, can be used for combustion. Prior to supplying the HWE derived liquor(s) to combustion, various pre-treatments can be performed. The pre-treatment of the HWE derived liquor can include one or more unit operations, such as filtration steps, evaporation, concentration, pre-heating, atomization, among others. FIG. 2 illustrates an embodiment with a number of pre-treatment steps. More regarding pre-treatment of HWE derived liquor will be discussed further below.

Referring to FIG. 2, in some implementations the HWE derived liquor that is obtained from the separation of the cooked mixture can be supplied to a filtration unit or another type of solids separator (e.g., strainer type separators, basket separators, belt, plate, etc.) in order to remove suspended solids. This solids separator can be designed to removed a certain concentration or size of suspended solids. This solids separation step can also include a series of separators for suspended solids removal. The process lines can include instrumentation to measure the suspended solids content of the input and output stream. The recovered solids can be disposed of or supplied for combustion via a separate entry into the combustion chamber.

Referring to FIG. 2, the solids-depleted HWE derived liquor can be supplied to an evaporator system (EVAP) to produce evaporator condensate and a first stage concentrated HWE derived liquor. The HWE derived liquor can be sent directly to the evaporator system from the filtration unit, or it can be supplied to holding tank(s), pump(s), or other intervening equipment. In some implementations, this evaporation step can include one evaporator or multiple evaporators in series or other types of evaporation systems. The HWE derived liquor fed to the evaporator system can have from about 2 wt % to about 10 wt % total dissolved solids (TDS) and can be concentrated by the evaporator system such that the first stage concentrated liquor has from about 25 wt % to about 35 wt % TDS, for example.

The first stage concentrated HWE derived liquor obtained from the evaporator system can then be fed to a concentrator system (CONC) that produces a second stage concentrated HWE derived liquor having from about 45 wt % to about 85 wt % TDS, or about 50 wt % to about 65 wt %, for example. The second stage concentrated HWE derived liquor can then be subjected to additional pre-treatments, such as additional filtration, pre-heating, and atomization, before being subjected to combustion. While a two-stage concentration system that includes an evaporator system followed by a concentrator system is the implementation illustrated in FIG. 2, it should be noted that other types of concentration arrangements (e.g., single-stage or three or more stages) can be used in order to remove water and increase the TDS of the HWE derived liquor.

Referring still to FIG. 2, the concentrated HWE derived liquor can be supplied to a holding tank followed by a day tank. It should be noted that various holding tank and pump systems can be used in connection with the overall process. Recycle lines can be provided for recycling part or all of the streams during certain operating conditions, when desired. The concentrated HWE derived liquor can have been concentrated to at least a threshold level of TDS, e.g., at least 45 wt %, at least 50 wt %, at least 55 wt %, or at least 60 wt %, from an initial level of about 2 wt % to about 10 wt %.

The concentrated HWE derived liquor can then be supplied to another filtration unit or another type of solids separator (e.g., strainer type separators, basket separators, belt filter, etc.) to remove suspended solids. The strainer-type separators can be used to facilitate removal of particle impurities from the fluid flow while enabling continuous flow and no flow interruption. It should be noted that strainer type separators can be used at various points of the pipeline upstream of the combustion chamber. For example, a solids separator can be used upstream of an indirect pre-heater in case the pre-heater operation would be improved by having a lower level of solids, for example to reduce fouling and plugging risks.

The filtered concentrated HWE derived liquor can then be fed to a pre-heater, which may be an indirect heat exchanger that uses steam or another heating means (e.g., flue gas, electricity) to produce a preheated HWE derived liquor.

Still referring to FIG. 2, the HWE derived liquor can be subjected to atomization for injection into the combustion chamber. The atomization can be done using various types of equipment that may include components that are provided in-line upstream of the combustion chamber and at the feed entry point of the combustion chamber. Atomization fluid can be used to help atomize the injected HWE derived liquor, and can include steam, air and/or a light gaseous hydrocarbon (e.g., propane).

Figure 3:
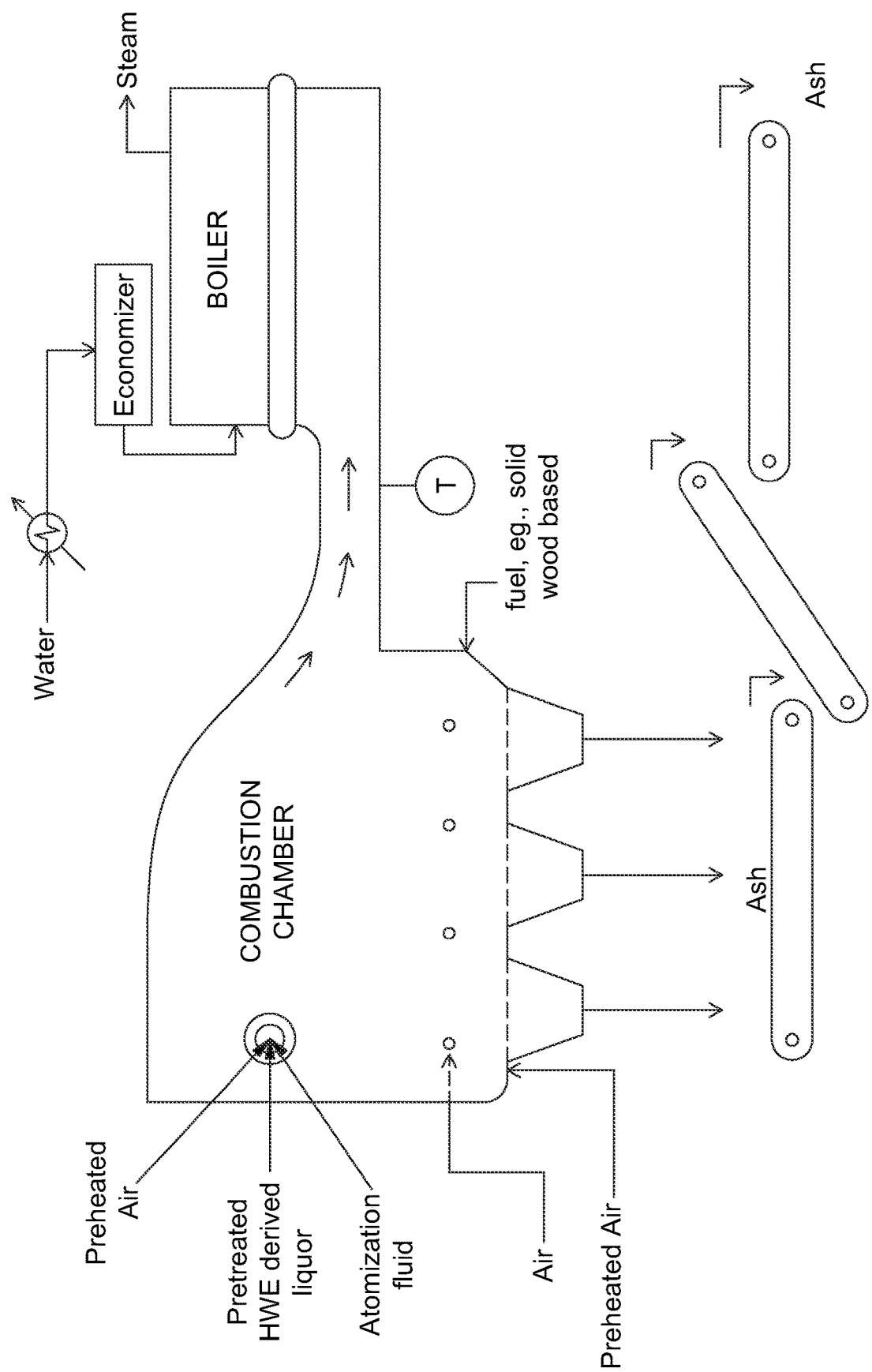
FIG. 3 is a process flow diagram showing a combustion chamber and a boiler chamber, where HWE derived liquor is used as a fuel source in the combustion chamber.

Referring to FIGS. 2 and 3, the HWE derived liquor can thus be supplied to the combustion chamber as a HWE derived liquor feed that is discharged into the combustion chamber along with other feed streams (e.g., oil, propane, natural gas, biomass for co-combustion, etc.) and combustion air. The combustion chamber produces ash, which can be discharged and conveyed via a conveyor system (e.g., belt chain). The ash can be supplied to a disposal area or holding repository. In some scenarios, co-combustion solid fuel can be used in the combustion chamber, such as wood based fuel that can be supplied using a feed screw device or other equipment. As mentioned above, solids removed during pre-treatment of the HWE derived liquor can be dried and supplied as solid fuel to the combustion chamber. In addition, air can be supplied to the combustion chamber at different locations and at different flow rates. Different air sources can also be used for each air injection system or location. Atomization fluid can be co-injected with air and the pretreated HWE derived liquor at the entry point of the combustion chamber. Various different combustion chamber designs and constructions can be used. For example, multiple entry points for the HWE derived liquor can be used.

Referring still to FIGS. 2 and 3, the heat generated by the combustion chamber can be used to boil water. The water can be pretreated, if necessary, and can then be preheated by an economizer prior to being fed into the boiler where the water boils to produce steam (e.g., high pressure steam). Various different boiler designs and constructions can be used.

Now referring to FIGS. 4a to 4g, the HWE derived liquor can be subjected to various unit operations and treatments in order to produce the pretreated HWE derived liquor that is supplied into the combustion chamber. FIG. 4a illustrates that the HWE derived liquor can be concentrated, which is particularly advantageous when the initial stream concentration is lower than desired for the combustion chamber operating conditions. For example, a HWE derived liquor with a dissolved solids concentration below 30 wt % (e.g., from 2 wt % to 10 wt %) may be concentrated up to above 45 wt % using evaporative or other water-removal techniques. The evaporative concentration can be performed to increase a dissolved solids concentration. In some scenarios, certain components of the HWE derived liquor can be removed or concentrated to provide improved combustability or handling of the HWE derived liquor and/or to potentially remove components that can be valorized or processed to produce bio-products. FIG. 4g illustrates an example where an evaporator followed by a concentrator are used to effect concentration of the HWE derived liquor.

FIG. 4b illustrates that the HWE derived liquor can be combined with another fuel in-line such that the combined stream can be fed into the combustion chamber and thus co-combust the two fuels. The additional fuel can be a bio-based fuel or a petroleum-based fuel or a combination thereof. The additional fuel can be liquid-phase or gas-phase at the operating conditions. The additional fuel can also be added into the HWE derived liquor at a point along the pipeline to enable proper mixing of the two components while not requiring the additional fuel to pass through all of the other pre-treatment units. For example, additional fuel could be added before or after the pre-heater, or before or after the second filtration unit illustrated on FIG. 2.

In some implementations, one or more co-combustion fuels are introduced independently via respective and independent inlets. For example, the HWE derived liquor feed can be introduced in the combustion chamber which is also fed with biomass (e.g., wood, wood residues, various mixtures of wood based materials derived from pulp and paper processing) fuel via an independent inlet, as illustrated in FIG. 3.

FIG. 4c illustrates that the HWE derived liquor can be subjected to atomization, which was also discussed in relation to FIGS. 1, 2 and 3. The atomization unit can be provided at the feed entry point of the combustion chamber, and can be configured according to various properties of the HWE derived liquor feed and other co-injected compounds as well as the operating conditions of the combustion chamber. For example, depending in the viscosity, TDS concentration, temperature, and flow rate of the HWE derived liquor, the atomization unit can be configured to have one or more nozzles, each sized and operated to form small droplets of the liquor upon entry into the combustion chamber.

FIG. 4d illustrates that the HWE derived liquor can be subjected to filtration or another type of suspended solids separation, which was also discussed in relation to FIGS. 1 and 2. The separators can be strainer type separators, basket separators, belt filters, drum filters, or other separators that can remove particulate impurities from the stream. The separators can be used at certain desired points along the pipeline, two of which are illustrated in FIG. 2. In addition, when a pre-heating step is also used, it may be advantageous to remove particulates from the stream upstream of the pre-heater especially when using an indirect heat exchanger. Removal of particulates can help reduce the issues related to fouling and can enhance the heat exchanger performance. Separators can also be used at other points along the pipeline, and can be configured to remove a certain particle size according to the downstream units through which the stream will be passing.

FIG. 4e illustrates that the HWE derived liquor can be subjected to preheating, which may employ an indirect heat exchanger, as discussed above. The preheating can be performed to preheat the HWE derived liquor to a temperature of at least about 55° C., at least about 60° C., at least about 65° C., at least about 70° C., at least about 80° C. or at least about 90° C. for example. It is also noted that the HWE derived liquor can be preheated to a temperature below its boiling point at the operating pressures of the system. It should also be noted that the process can include pre-heating other streams that are fed into the combustion chamber, e.g., air, co-combustion fuel, etc.

FIG. 4f illustrates that various additives can be added to the HWE derived liquor prior to introduction into the combustion chamber. Such additives can include the co-combustion fuel, as discussed above in relation to FIG. 4b, and/or other compounds that can improve certain unit operations. The additives can be added in-line (e.g., at a tee joint, as illustrated) or via a mixer device (e.g., in-line mixers, tank mixers, pump, etc.). The addition locations can also be selected so that the additive and the stream have adequate time and shear energy imparted thereto in order to properly mix together and, as the case may be, chemically react prior to the next unit operation.

Combustion techniques of HWE derived liquor disclosed herein can be used in the context of a pulp and paper process, such as the one illustrated in FIG. 1, and/or in the context of a biorefinery that converts biomass into various downstream bio-products. HWE derived liquor can be produced from various biomass sources. While it may be desirable to convert the HWE derived liquor to value-added bio-products using various physical, chemical and biochemical unit operations, there are several scenarios where some or all of the components of the HWE derived liquor can be combusted to generate heat that can be used, for example, in steam generation.

In some implementations, a biorefinery may be in start-up mode during which certain HWE derived liquor processing/conversion lines are not operational, and thus all of the HWE derived liquor can be subjected to combustion during this time. As the biorefinery transitions to normal operation and processing/conversion units come online, the HWE derived liquor used in combustion can be reduced or periodically stopped. In addition, market considerations can come into play, e.g., if bio-products derived from the HWE derived liquor reduce in value it may be more economical to divert some or all of the HWE derived liquor to the combustion chamber. In some situations, certain compounds of interest (e.g., polysaccharides in general or a certain polysaccharide of interest that can be used to produce value-added bio-products) can be removed from the HWE derived liquor and the remaining HWE derived liquor can be used for combustion. In addition, the HWE derived liquor production rate may exceed the HWE derived liquor conversion rate for certain bio-products and certain plant designs, leading to an accumulation of HWE derived liquor and/or its components on site. In such scenarios, disposal of the HWE derived liquor by combustion is an attractive use of the resource. Furthermore, the amount of HWE derived liquor used in the combustion unit can vary over time due to one or more of the above-mentioned factors, and thus the pre-treatment units, the combustion chamber, and the equipment for supply and addition of any co-combustion fuel can be provided and operated accordingly.

Experimentation

Tests were performed to assess combustion of HWE derived liquors. In one test series, HWE derived liquors containing 50 wt % TDS were tested. In terms of conclusions, it was found that 50 wt % TDS HWE derived liquors could be combusted with pre-mixing of another co-combustion fuel; that at optimum operating conditions the efficiency of combustion was excellent with low CO emissions (0 to 30 ppm); and that pre-heating the air enhanced the results significantly. It was also found that suitable combustion of 50 wt % TDS HWE derived liquor is enhanced by addition of a co-combustible fuel, which can be added independently and does not require pre-mixing. It was also found that the HWE derived liquor provide a part of the oxygen required for combustion, which can thus be used to aid in determining the required air flow rate to add. In addition, it was found that HWE derived liquors can display clogging and plugging issues; and thus certain handling techniques, chemical addition, concentrations can be used to reduce such issues.

A Freco™ 80 Hp boiler with a burner having mechanical atomization was tested along with a Cleaver Brooks™ 200 Hp boiler with a burner having a steam-based atomization. The steam-based atomization provided improved performance and reduced plugging issues. In addition, it was found that a number of features enhanced performance, including air pre-heating, independent feeding of the propane and HWE derived liquor streams, extending the refractory portion of the combustion chamber, the installation of a choke device at the exit of the refractory portion.

Successful combustion was performed using a 60/40 v/v mixture of HWE derived liquor and propane, the mixture having been pre-mixed prior to introduction into the combustion chamber.

Additional tests were performed to assess HWE derived liquor combustion without pre-mixing with other fuels. Propane was used and the co-combustible was fed via a separate inlet from the HWE derived liquor inlet. This also made it possible to independently vary the flow of air for combustion. In some tests, cold HWE derived liquor was recirculated (for approximately 12 hours) to heat the mixture to about 85° C. Details regarding three tests are provided below, in which a Cleaver Brooks™ 200 Hp boiler was also used and the HWE derived liquor was fed independently of the co-combustible (propane):

In a first test, a flow of 110 L/hr of HWE derived liquor was provided and was then increased to 200 L/hr. After 30 minutes, carbon accumulation was observed and the test was terminated.

A second test was done with 150 L/hr of HWE derived liquor and the atomization vapour pressure was varied from 90 to 70 psig during combustion over one hour at the following conditions. Propane was used as a co-combustion fuel.

| | |
|---|---|
| Pressure of vapour atomization | 30 psig |
| Pressure of hemicellulose to burner | 30 psig |
| O2 | 9.5 to 9.8% |
| CO | 40 to 112 ppm |
| HWE derived liquor flow rate | 116 L/hr |

During this trial, the energy produced by the HWE derived liquor was calculated to be 1090425 KJ with 116 litres of HWE derived liquor, giving 4050 BTU per litre. Taking into account boiler efficiency of 85%, a value of 4764 BTU/lbs for the HWE derived liquor was obtained. In such conditions, the HWE derived liquor provided 31% of the energy.

In a third test, the principal difference was the use of preheated combustion air. The pressure conditions were stable during the test (85 lbs). During the tests with propane only, the pressure of steam produced was stable at 75 psig with the same flow rate of propane. This confirms that the energy contribution of HWE derived liquor was positive. The conditions in this test were as follows:

| | |
|---|---|
| Pressure of vapour atomization | 42.5 psig |
| Pressure of hemicellulose to burner | 30 psig |
| O2 | 6.9 to 8.9% |

-continued

| | |
|---|---|
| CO | 1 to 13 ppm |
| Air temperature (preheated) | 265 to 275° F. |
| Hemicellulose flow rate | 45 to 50 lph |

During this third test, the most positive results were obtained for the combustion as indicated by the low CO emission levels. The colour of the flame also showed complete combustion. Combustion of the HWE derived liquor was calculated to contribute about 10% of the energy for an energy value of 2500 BTU per lbs for the HWE derived liquor.

It should be noted that at the end of the fourth test, the flow rate was increased from 50 lph to 110 lph for a few minutes and the combustion observed was excellent. This flow rate corresponds to 21-27% energy contribution of HWE derived liquor.

The fourth test also confirms the positive impact of certain pre-treatment features, such as the preheating of the combustion air, where the flame quality, the low CO emissions and the absence of smoke in the combustion gas were positive observations.

There was little variation in residual oxygen in the combustion gas with the introduction of the HWE derived liquor. The variation from 50 to 110 lph without varying the combustion air may indicate that the HWE derived liquor provides oxygen.

The invention claimed is:

1. A process for combusting a hot water extraction (HWE) derived liquor, comprising:
   producing the HWE derived liquor comprising:
   subjecting wood material to HWE to produce a mixture comprising fibres, water, dissolved solids and suspended solids;
   separating the mixture into a fibre-enriched stream and a fibre-depleted stream; and
   pre-treating the fibre-depleted stream to yield the HWE derived liquor, wherein the pre-treating comprises suspended solids removal; and
   co-combusting the HWE derived liquor and a solid-containing biomass in a combustion chamber, wherein at least part of the solid-containing biomass comprises recovered solids obtained from the suspended solids removal during pre-treating of the fibre-depleted stream.

2. The process of claim 1, wherein the solid-containing biomass comprises wood residues.

3. The process of claim 1, wherein the solid-containing biomass further comprises wood, mixtures of wood-based materials derived from pulp and paper processing, or any combination thereof.

4. The process of claim 1, wherein co-combusting the HWE derived liquor and the solid-containing biomass comprises supplying the solid-containing biomass to the combustion chamber via an independent inlet.

5. The process of claim 4, wherein the solid-containing biomass is supplied to the combustion chamber using a feed screw device.

6. The process of claim 1, wherein co-combusting the HWE derived liquor and the solid-containing biomass comprises adding the solid-containing biomass to the combustion chamber simultaneously and via a same inlet as the HWE derived liquor.

7. The process of claim 1, wherein the pre-treating comprises subjecting the fibre-depleted stream to
the dissolved solids concentration that is performed in an evaporator followed by a concentrator to produce a concentrated HWE liquor; and
the suspended solids removal that comprises filtering the concentrated HWE liquor to remove additional suspended solids therefrom.

8. The process of claim 1, wherein the pre-treating comprises:
filtering the fibre-depleted stream to produce a filtered HWE derived liquor having a dissolved solids concentration of about 2 wt % to about 10 wt %; and
concentrating the filtered HWE derived liquor to produce a concentrated HWE liquor having a dissolved solids concentration of at least 45 wt %.

9. The process of claim 1, wherein the suspended solids removal is performed using a strainer type separator, a basket separator, a belt filter and/or a drum filter.

10. The process of claim 1, wherein the pre-heating is performed in at least one indirect heat exchanger that receives a heating fluid.

11. The process of claim 1, wherein the pre-heating is performed in an electric pre-heater.

12. The process of claim 1, wherein the pre-heating preheats the HWE derived liquor to a temperature of at least about 55° C.

13. The process of claim 1, wherein the pre-treating comprises the pre-heating that is performed to produce a pre-heated HWE derived liquor, and further comprises subjecting the pre-heated HWE derived liquor to atomization to produce an atomized HWE derived liquor that is subjected to the co-combusting.

14. The process of claim 13, wherein the atomization is performed by injecting pressurized air, steam and/or a light hydrocarbon into the pre-heated HWE derived liquor.

15. The process of claim 1, wherein the pre-treating further comprises removal of polysaccharides from the HWE derived liquor before co-combusting thereof.

16. The process of claim 1, wherein the co-combusting of the HWE derived liquor is further performed in presence of a co-combustion fuel that is oil, propane, natural gas, or any combination thereof.

17. The process of claim 1, wherein the co-combusting of the HWE derived liquor is performed in presence of combustion air, and the process includes injecting the combustion air in the combustion chamber from different locations of the combustion chamber.

18. The process of claim 1, wherein pre-treating the fibre-depleted stream further comprises dissolved solids concentration or pre-heating, or a combination thereof.

* * * * *